United States Patent [19]

Scher et al.

[11] 4,092,198
[45] May 30, 1978

[54] PROCESS FOR HIGH PRESSURE DECORATIVE LAMINATE HAVING REGISTERED COLOR AND EMBOSSING AND RESULTANT PRODUCT

[75] Inventors: Herbert I. Scher; Israel S. Ungar, both of Randallstown; Joseph A. Lex, Glen Burnie, all of Md.

[73] Assignee: Exxon Research & Engineering Co., Linden, N.J.

[21] Appl. No.: 629,123

[22] Filed: Nov. 5, 1975

[51] Int. Cl.$^2$ .............................................. B32B 31/20
[52] U.S. Cl. ..................................... 156/222; 101/32; 156/219; 264/132; 264/137; 428/165; 428/171; 478/172
[58] Field of Search ................................ 156/219–222; 428/151, 156, 161, 165, 172, 195, 207, 204; 264/284, 319, 129, 131, 132, 134, 135, 137; 427/256, 271, 276, 277; 101/32

[56] References Cited

U.S. PATENT DOCUMENTS

| | | | |
|---|---|---|---|
| 3,219,506 | 11/1965 | Dusina, Jr. et al. | 156/220 |
| 3,379,560 | 4/1968 | Tharp | 428/174 |
| 3,666,604 | 5/1972 | Coffet | 156/199 |
| 3,802,947 | 4/1974 | McQuade, Jr. | 156/220 |
| 3,808,024 | 4/1974 | Witman | 428/156 |
| 3,814,647 | 6/1974 | Scher et al. | 156/219 |
| 3,823,046 | 7/1974 | Yamagishi | 156/220 |

Primary Examiner—George F. Lesmes
Assistant Examiner—Stanley S. Silverman
Attorney, Agent, or Firm—Karl W. Flocks

[57] ABSTRACT

A decorative high pressure laminate having registered color and embossing is produced by effecting simultaneous embossing and laminating using a three-dimensional sculptured press plate acting against an overlay sheet having therebeneath a print sheet having a coating containing a high flow melamine resin and pigment, so that during the pressing operation the resin and pigment coating flows laterally from the high pressure areas to the low pressure areas with the result that the underlying print sheet is visible through the overlay sheet in the high pressure areas while the pigment in the coating on the print sheet in the low pressure areas mask the print sheet.

6 Claims, 2 Drawing Figures

PROCESS FOR HIGH PRESSURE DECORATIVE LAMINATE HAVING REGISTERED COLOR AND EMBOSSING AND RESULTANT PRODUCT

FIELD OF INVENTION

The present invention relates to high pressure decorative laminates and, more particularly, to such high pressure decorative laminates having aligned color and embossing which are in exact registry, and a process for preparing such laminates.

BACKGROUND

The production of high pressure laminates is well known, having been carried out for many years. Generally, the procedures for forming such laminates involve providing phenolic (i.e., phenol-formaldehyde) resin impregnated paper core sheets and melamine (i.e. melamine-formaldehyde) resin decorative and overlay sheets, and pressing the stacked resin impregnated sheets under heat on the order of 230°-310° F and under pressure of approximately 800–1600 psi until the resins have become thermoset, thereby providing an extremely hard, attractive and permanent surfacing material known as a "high pressure laminate" meeting NEMA Standards. These high pressure laminates have, for many years, found use as counter and table tops, bathroom and kitchen work surfaces, furniture and cabinet surfacing, wall paneling and partitionings, doors, etc.

Most general purpose decorative high pressure laminates, of about 1/16 inch thickness, are formed of an assembly comprising a top ply of $\alpha$-cellulose paper, about 20–30 lbs. ream weight, impregnated with a partially cured water solution of melamine-formaldehyde condensate; a print ply therebeneath, normally also an $\alpha$-cellulose paper, pigment filled, with or without decorative printing on the surface thereof, ranging in weight from 50 to 125 lbs. ream weight and also impregnated with a partially cured amino resin condensate, usually the same melamine resin as used in the overlay ply, and therebeneath a plurality (e.g. six) core plys which are normally 100–130 lbs. ream weight Kraft paper, impregnated with a water or alcohol soluble partially cured phenolic resin condensate. All of such partially cured resin condensates are referred to as being in the "B-stage"; in this stage they are thermoplastic and will flow under heat and pressure during the high heat, high pressure laminating procedure.

The above described assembly is repeated, back-to-back and front-to-front using separators therebetween, each two laminates being separated by a pressing plate die, until a "book" containing, typically, 10 assemblies is obtained. The book is inserted in a high pressure press, and the laminates are cross-linked under the conditions of heat and pressure indicated above. During the pressing cycle, the resins flow and then cure, consolidating the individual plys and forming a comprehensive and infusible cross-linked product. After cure, the book is removed from the press and the laminates are separated, trimmed, and their backs or bottom surfaces sanded to improve adhesion for subsequently gluing to various substrates.

In the early years, generally only glossy surface laminates were produced (i.e. using polished molding surfaces), though some attempts were made to provide laminates with some slight surface irregularities to give satin or "textured" finishes. In more recent years it has become increasingly desirable to provide various types of irregular surfaces, ranging from relatively shallow depressions such as textured (e.g., satin, matte or semi-gloss) surfaces, to relatively deeply "sculptured" or embossed surfaces which have a noticeable three-dimensional effect, such as wood grain, leather, slate, abstract patterns, creative designs, etc. Particularly with the rising costs of natural products, it has become more desirable to provide deeply sculptured high pressure laminates which simulate natural materials such as wood, leather and slate.

Today, high pressure decorative laminates meeting NEMA Standards are manufactured with smooth glossy surfaces, with textured surfaces, or with deeply sculptured or embossed surfaces. In the latter case, a textured surface is usually superimposed on the embossed surface, and these textured surfaces are normally obtained by utilization of a release, parting or separating membrane or sheet of known type which is located, during the laminating operation, between the upper surface of the uppermost laminate and the molding plate die. In the production of deeply sculptured surfaces which simulate natural products such as slate, leather and wood, it is particularly desirable that the textured surfaces be superimposed over the face of the simulated product, since this provides a softer and more naturally appearing product.

In the manufacture of deeply embossed or sculptured surfaces having surface depth variations which duplicate natural products such as slate, leather, wood and the like, it has in the past generally been necessary to use either extremely expensive etched steel or stainless laminating die plates or, alternatively, thermoset pressing plate dies such as described in the Michaelson et al U.S. Pat. Nos. 3,303,081 and 3,311,520. While the use of such dies provides the necessary embossing, many simulated natural products, such as wood grain, must have appropriate color in registry with the surface embossing or debossing. Unfortunately, the problem of registration of color and embossing has proven very difficult, conventional registry techniques such as used in the printing industry being unreliable on a consistent basis in the manufacture of high pressure laminates, and also being extremely expensive, often involving complex electronic sensing equipment.

Other methods of providing laminates having registered color and texture have utilized valley printing, namely the inking of high portions of an engraved plate and pressing into the resin while curing. This operation, as well as the mechanical registration of an embossing roll or plate with a print, is difficult to carry into production and/or does not always give a uniform product. In addition, inks may not be compatible with or as durable as the base resin in which case the product will not meet NEMA Standards.

In more recent years, a number of other techniques have been developed in an attempt to solve the problems of registration of color and embossing in the manufacture of deeply sculptured high pressure laminates. Certain of these techniques have been found to be highly useful in the preparation of certain specific types of configuration, e.g. see U.S. Pat. Nos. 3,700,537 and 3,698,978. Other recent techniques have been more versitile from the viewpoint of the design of the product (note, e.g., U.S. Pat. Nos. 3,814,647; 3,732,137; 3,802,947 and 3,661,672), but some of these recent techniques have been less than fully desirable because they require special materials and/or are difficult to carry out successfully with the result that the products are sometimes inconsistent or the manufacturing operation is more expensive than is desirable.

In copending application Ser. No. 528,776*/(incorporated here by reference) there is disclosed a method of providing registered color and embossing in which the overlay sheet is impregnated with melamine resin containing dispersed pigment, and this overlay sheet is then used in the conventional lay-up over a conventional melamine impregnated print sheet of contrasting color. While the process exemplified in application Ser. No. 528,776 produces a laminate of exceptional appearance particularly when the product is a mottled pattern in which the darker color overlies the lighter color, e.g. simulated leather, such exemplified process does have certain disadvantages. First, it is difficult to carry out and therefore requires exceptional care to impregnate the overlay sheet, without having longitudinal streaks of pigment concentrations. This is due to the mechanics of impregnation and is not a fundamental problem.

Secondly, and more fundamental is the fact that the process exemplified in Ser. No. 528,776 provides a product which may not have as great an abrasion resistance as is desired. Because much of the pigment is concentrated near the the overlay surface, and the finished laminate surface is heavily embossed, the peaks show loss of color earlier than desirable in the simulated wear tests unless this wear is compensated by usng extraordinary measures, e.g. an extra impregnated overlay sheet, i.e. two overlay sheets. While the use of the second overlay sheet considerably improves the abrasion resistance, this solution reduces the crispness of the color contrast in the fine embossing details with the result that the product is sometimes not as attractive as is desired.

A third disadvantage of the technique exemplified in Ser. No. 528,766 is that by incorporating the dispersed pigment in the overlay by means of impregnation including first saturating the overlay with pigment dispersed resin and then wiping excess from its surface, the saturating characteristics of the overlay paper have undue influence over the color uniformity of the final product. That is, the normal density and wicking properties of the paper that vary from point-to-point in a sheet may cause variation in resin-pigment concentration at different locations across the area of the sheet. In a conventional overlay, this does not cause problems because there is enough resin to provide suitable physical properties even in low concentration areas, and the variation is not visible because the resin is almost transparent. When the pigmented resin is used, however, concentration variations sometimes result in a mottled appearance in the finished laminate if the pigment is not strongly opaque and, therefore, the technique exemplified in Ser. No. 528,776, while giving a highly realistic mottled simulated product such as leather, is not as suitable for other designs containing larger smooth areas where color variation is not desirable, if the pigment is not strongly opaque.

SUMMARY

It is, accordingly, an object of the present invention to overcome deficiencies in the prior art, such as indicated above.

It is another object of the present invention to provide improved high pressure decorative laminates.

It is another object to provide an improvement to the process exemplified in Ser. No. 528,776.

It is another object to provide an improvement to the product exemplified in Ser. No. 528,776.

It is another object to provide a unitary high pressure decorative laminate having registered color and embossing in different areas, whether or not the product's coloring is mottled, irregular and/or non-uniform or variable, in a simple and inexpensive manner.

It is another object of the present invention to produce high quality decorative high pressure laminates, having registered color and embossing, in a simplified and inexpensive manner.

It is another object of the present invention to provide a new and improved method for inexpensively manufacturing high pressure laminates having registered color and embossing.

It is another object of the present invention to provide a high pressure decorative laminate having registered color and texture such that the surface of the laminate has high durability sufficient to meet NEMA Standards, and in which exact registration is assured.

In the present exemplification, there is disclosed a method which involves using, in place of the conventional print sheet, a print sheet which is coated on its upper surface with a melamine resin containing finely ground pigment, the quantity of pigment being a function of the color and hiding power of the pigment selected, and the color being a color which contrasts with the color of the print sheet itself. The melamine resin containing finely ground pigment lies as a surface coating on the print sheet and is not impregnated substantially into the interior of the paper sheet. The resin content, volatile content and flow of the coating are so selected in conjunction with the pigment hiding power and depth and sharpness of impressions on the die, that during pressuring most of the resin and pigment flows laterally from the high pressure aras to the low pressure areas. The resultant product has registered embossing and coloring with the pigment of the print layer coating being concentrated in the embossed areas and the print sheet color showing through at the debossed areas.

Compared with the process exemplified in Ser. No. 528,776, the present process uses the pigment dispersed resin as a coating to the upper surface of a conventionally impregnated print sheet, rather than as an impregnant within the overlay sheet, and the coated print sheet is used in conjunction with a conventional clear resin impregnated overlay sheet. This approach overcomes the problems which are found to occur in the process and product exemplified in Ser. No. 528,776, even though the melamine resin and pigments used in the present exemplification are similar to those used in Ser. No. 528,776.

BRIEF DESCRIPTION OF THE DRAWING

To the attainment of these ends and the accomplishment of the above as well as other new and useful objects as will appear below, the invention relates to the features of novelty in substantially the construction, combination and arrangement of the several parts hereinafter described and shown in the accompanying drawing as an example illustrating this invention, and in which.

DETAILED DESCRIPTION OF EMBODIMENTS

Figure 1:
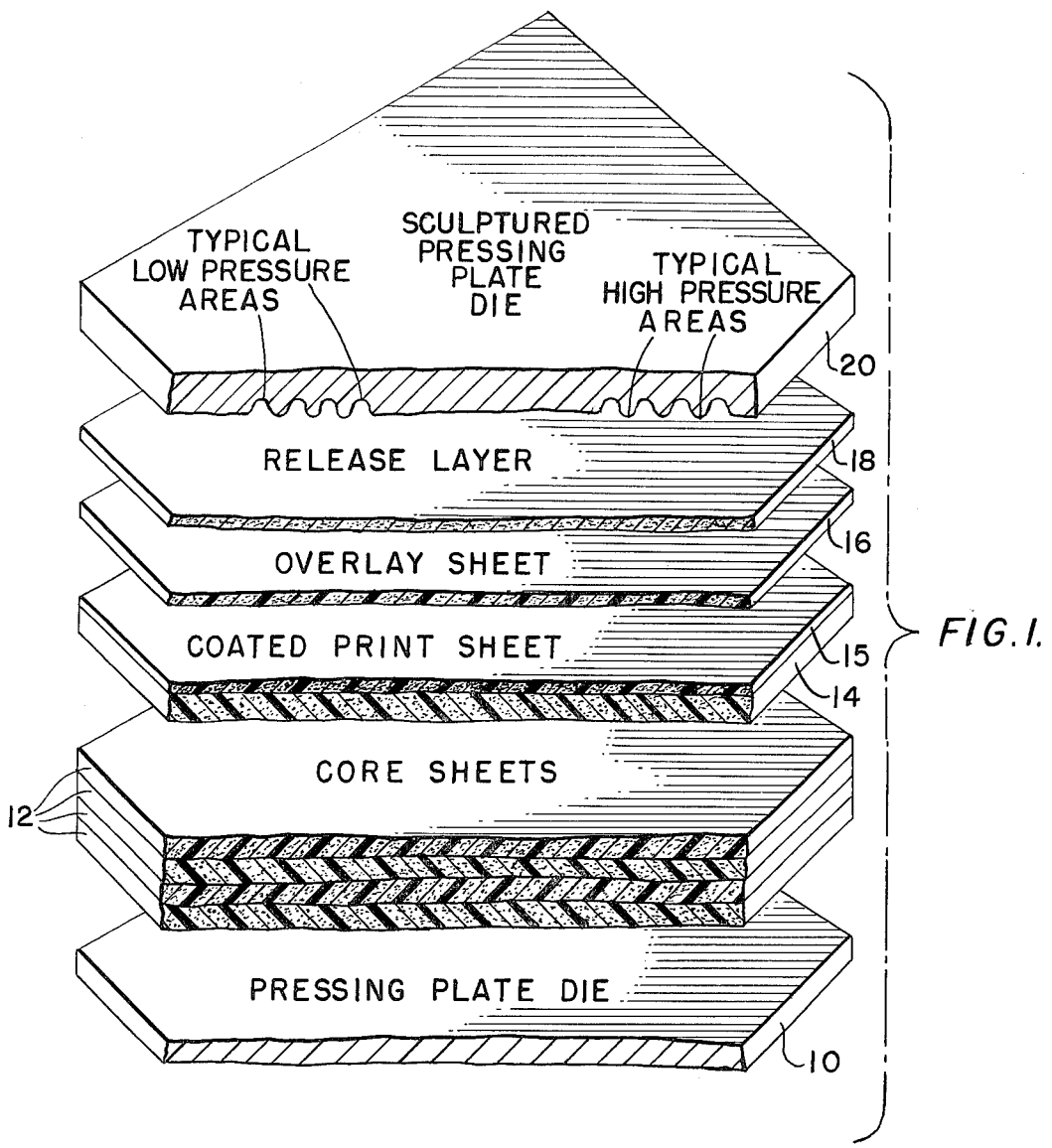
FIG. 1 schematically shows the formation of a high pressure laminate in accordance with the present invention.

Referring to FIG. 1, there is seen an assembly for producing an embossed decorative high pressure laminate in which the embossed areas have different color from the debossed areas. From the bottom up there is provided the conventional bottom pressing plate 10 having a flat, but unfinished surface; the conventional plurality of phenolic resin impregnated paper core sheets 12; an amino resin impregnated color print sheet 14 having a special coating 15; the conventional overlay sheet 16; a conventional parting or release layer 18; and the sculptured or embossed pressing plate die 20.

The colored print sheet 14 need differ from the convential colored print sheet only in that it has applied to its upper surface a coating 15 of melamine resin and pigments similar to that used in Ser. No. 528,776. The pigment dispersed in the melamine resin is coated over the print sheet 14 and is then dried and partially cured, so that during the final laminate pressing it flows between the high and low areas, resulting on the same type of horizontal color distribution as disclosed in Ser. No. 528,776.

In more detail, a conventional solid color print sheet 14 is impregnated with clear melamine resin, in accordance with conventional practice, and is then dried and partially advanced to cure. It is preferred, but not essential, that such cure be advanced to a greater degree than usual, e.g. about 3-5% volatile rather than about 6% volatile content, in order to inhibit penetration into the sheet 14 of the subsequently applied coating 15, to thereby improve color contrast in the final product. To the upper surface of the dried print sheet 14 is then applied a coating 15 of melamine resin containing dispersed pigments, such as described in Ser. No. 528,776, using colors contrasting with the solid color of the print paper 14. This coating 15 is subsequently oven dried and partially cured.

The lay-up as shown in FIG. 1 is then assembled using the sculptured plate 20, the parting sheet 18, the conventional impregnated overlay sheet 16, the print sheet 14 having the coating 15, and the core sheets 12. When pressed, the resultant laminate has the same registered color-embossing design as described in Ser. No. 528,776. Using a single overlay sheet, the resultant laminate provides satisfactory properties in the NEMA simulated wear test; that is, there is no objectionable color loss at the peak areas until after the NEMA required end point has been exceeded.

As indicated above, the nature of the coating composition in the present exemplification is similar to that of impregnating solution in application Ser. No. 528,776. The usual amino resin, preferably melamine resin, impregnating solution is used to which has been added the desired pigment. It will be understood that the coating 15, after being dried on the print sheet 14, must be capable of lateral flow during the laminating process. Contrary to Ser. No. 528,776, the volatile content and flow of the dried coating 15 cannot be measured because such coating is so thin, and, accordingly, the best measurement which can be taken is the combined measurement of the relatively thick pre-dried print sheet 14 (which has been re-dried during the drying of the coating 15) together with the thin dried coating 15 which contributes very little to the over-all measurement. An optimum volatile content of dried base paper 14 plus dried coating 15 is about 4.5% with about 0.3% flow, it being understood that higher volatiles and flow will give greater movement from low spots to high spots, while lower volatiles and flow will reduce such movement. Proper values will be easily determined in any particular case by routine testing.

The ratio of pigment to resin in the coating 15 is subject to wide variation. The greater the quantity of pigment, the darker will be the color contributed by such pigment; the less the quantity of pigment, the lighter will be the color contributed by such pigment. Other vairables which affect the pigment:resin ratio are the hiding power of the pigment itself and the color of the print sheet 14 which is to be masked in certain areas by such pigment. In general, the pigment:resin ratio is controlled by the effect desired and this may also be determined by routine testing. Usually, however, the pigment content will be a 20-50% by weight based on the resin solution, which solution is coated on the pre-dried print sheet 14 at the rate of about 2-5 grams per sq. ft., and then dried.

The choice of pigment is also subject to wide variation. Any pigment dispersible in the resin impregnating solution is suitable, including water dispersible pigments such as aqueous dispersed pigment pastes. Dry pigment, such as $TiO_2$, may also be used, but in the case of such pigments which have a tendency to settle out of the resin solution, it is necessary to either keep the solution stirred prior to coating to prevent settling, or add suspending and/or thickening agents.

With regard to the nature of the sculptured pressing plate die 20, any such plate may be used, although the nature of the embossing pattern should be such that the transition from the embossed portions or peaks to the debossed portions or valleys should be relatively steep in order to cause sufficient pressure differential between such adjacent portions to drive the color coating 15 from the high pressure areas to the low pressure areas. For example, one may use an expensive machined or etched steel or stainless steel plate, or one may use a molding plate of the type described in the Jenkins Pat. No. 2,606,855, or the Michaelson et al U.S. Pat. Nos. 3,303,081 and 3,311,520. Also, one may use a thin, embossed, impregnated separator sheet having a nonstick facing of the type disclosed in the Scher et al U.S. Pat. No. 3,674,619, as the embossing surface, in which case the release layer 18 may be eliminated along with the sculptured printing plate die 20, though a flat pressing plate of the nature of pressing plate die 10 will be used to back up the thin, embossed, impregnated separator sheet.

In those instances, where a release or parting layer 18 is used, such layers, may be selected from those commercially available. These release layers 18 usually provide the dual function of imparting a textured finish to the laminate and also preventing adhesion of the upper surface of the laminate, i.e. the overlay layer 16, to the sculptured pressing plate die 20. Among the release sheets 18 commercially available may be mentioned aluminum foil, silicone resin or silicone oil treated paper, "Quillon" treated paper, fluorocarbon resin treated paper, sodium alginate treated paper, paper-aluminum foil laminate, parchment or glassine papers, etc. Any of these materials may be used as the release layer 18, so long as the non-adherent surface of the release layer 18 is facing the overlay 16.

The overlay sheet 16 may be of the conventional type, formed of α-cellulose paper and impregnated with melamine resin so that, upon pressing and curing, the overlay sheet becomes generally transparent.

The print sheet 14, before application of the coating 15, may be of a conventional type, either of one color or a plurality of colors. As indicated above, such print sheet 14 will normally comprise α-cellulose paper pre-impregnated with melamine resin and dye or pigment and dried. A preprinted design may be applied to its upper surface, it being understood that in such a case the coating 15 would then be applied over such print. The color of the print sheet is chosen for its desired contrast to the pigment in the coating 15.

The plurality of core sheets 12 will normally comprise Kraft paper impregnated with phenolic resin in accordance with usual practice. The pressing plate die 10, located immediately below the core sheets 12, may comprise a simple metallic plate, such as is conventionally used.

The lay-up or assembly or composite is cured usng a normal pressing cycle at 800-1200 psi and 260°-310° F for 45-90 minutes, the press time given assuming starting with a cold press and ending cold. The resultant product is provided with embossed areas and debossed areas by pressing against the sculptured pressing plate die 20.

During pressing, the melamine resin melts, flows and then cures to a hard, infusible state. When the press is opened a pleasing texture is present with pigment concentrated in the embossed areas and the print sheet showing through at the debossed areas. It is clear that the pigment and most of the resin move laterally from the high pressure areas to the low pressure areas and, in the product, varying amounts of the print sheet color show through depending on the amount of flow of the coating 15, which in turn depends on the varying pressure from point-to-point, which in turn depends on the design in the embossed press plate 20.

Figure 2:
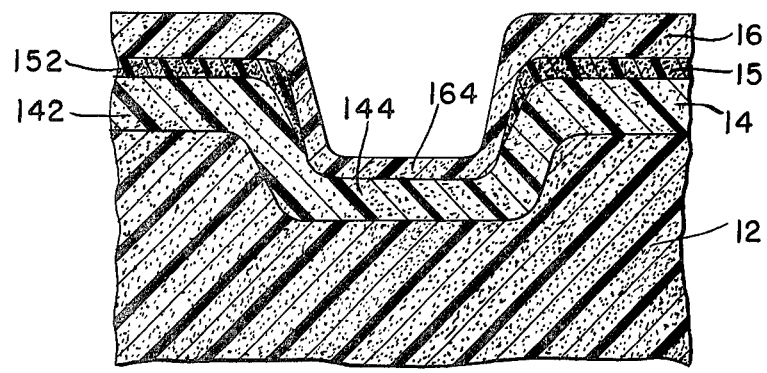
FIG. 2 is a schematic cross-section of a portion of a laminate in accordance with the present invention.

Referring to FIG. 2 there is shown a small portion of a cross-section of a laminate produced in accordance with the present invention. Various type products may be made including simulated natural products, such as leather and wood, having mottled irregular type patterns, as well as patterns which are not mottled or irregular. From FIG. 2, it is seen that the coating 15 has been driven away laterally from the debossed portion and the print layer 14 can be seen at portion 144 through the relatively thin and transparent portion 164 of the transparent overlay sheet 16. To the contrary, at the embossed portions of the laminate, the coating 15 is relatively thick at 152 having been concentrated by the migration of pigment and resin from the debossed portion, so that the print layer 14 is not visible through the opaque portion 152 of the coating 15 within the laminate. Between the two extremes there is a gradual transition.

The resulting laminate has the color of the pigment in the coating 15 at the embossed portions and at the debossed portions has the color of the print sheet 14, with varying shades therebetween depending on the slope or sharpness of the peaks, it being understood that the overlay 16 is generally transparent as is normal. As seen in FIG. 2, the coating 15 forms a very thin generally discontinuous layer of pigment and resin lying between the overlay 16 and the base print 14, of non-uniform thickness with its thickest portions lying at the highest peaks of the laminate and becoming progressively thinner with its thinnest portions lying at intermediate levels. In general, it will be understood that any combinations of print paper color and pigment color in the coating 15 are possible, although better results are obtained when the pigment in the coating 15 is darker than the color of the print sheet 14, with the result being a high pressure laminate having areas with contrasting color and surface configuration in exact registration.

The above process is not limited to high pressure laminates, but is equally applicable to the so-called low pressure board where surface sheets are applied directly to particle board.

The following examples, offered for purposes of further illustration without limitation, will more fully reveal the nature of the invention.

EXAMPLE I

A bright yellow solid color base paper was impregnated with conventional melamine-formaldehyde resin to a conventional resin content of 50%, and was dried to a 4.8% volatile content, somewhat lower than the normal 6%.

One surface of such yellow print sheet 14 was then coated with the following melamine resin-pigment mixture containing 37% pigment at the rate of 3.6 gm/sq.ft.:

125 gms — 62% melamine resin solution
37 gms — Yellow 142 pigment
35 gms — Brown 295 pigment
0.38 gms — Black X60 pigment.

The coating 15 was then dried on the base sheet 14 for 3 minutes at 260° F to give a volatile content of coating plus base paper of 4.5% and a flow of 0.3%.

The lay-up of FIG. 1 was then assembled using 6 phenolic core sheets instead of the 4 illustrated. The assembly was pressed between metal plates under conventional conditions. The color-texture registration was obtained, and abrasion resistance exceeded NEMA requirements.

EXAMPLE II

Example I was repeated using 2 parts by weight of TiO$_2$ as the pigment in 100 parts by weight of the resin solution. The mixture was coated on a dark brown base paper 14 containing 51% resin at 4% volatile content. The coating 15 was then dried on the base sheet 14 at 260° F for 2.5 minutes.

The lay-up of FIG. 1 was assembled using a pebbled texture plate 20. After pressing, the resultant laminate was gray-white on its peaks and gray-brown in its valleys 164.

EXAMPLE III Series

A series of examples were carried out using various dispersed colors at different concentrations. The colors used included:

SANDOZ:
  Graphtol Blue
  Graphtol Yellow
  Graphtol Red
and
BASF WYANDOTTE:
  Luconyl Yellow
  Luconyl Blue
  Luconyl Red
  Luconyl Brown Using a coating 14 containing 30% red and brown pigments over a yellow print sheet 14, a laminate having red-brown peaks and orange valleys was obtained. Using a coating 15 containing green pigments over a yellow print sheet 14 gave a laminate having green embossments and greenish-yellow debossments. Similarly, a brown pigmented coating 15 over a white base 14 gave a laminate having brown peaks and tan valleys.

In all these examples, runs were conducted with low pigment concentrations of 5-10%, which gave pale colors, and higher pigment contents of 30% and more, which gave strong colors in the final products. The present invention may be used to make products of great variation in surface depth embossing ranging from up to 7 mils for the simulation of certain natural products such as leather and wood, to greater than 20 mils surface depth variation for a cane-like product.

The foregoing description of the specific embodiments will so fully reveal the general nature of the invention that other can, by applying current knowledge, readily modify and/or adapt such specific embodiments without departing from the generic concept, and, therefore, such modifications and adaptations should and are intended to be comprehended within the meaning of the invention and the range of equivalents of the disclosed embodiments.

Modifications, for example, may comprise applying the coating 15 to the bottom of the overlay 16, or the coating could be applied on top of or below an extra, preferably thin, pre-dried overlay sheet located between the print sheet 14 and the overlay sheet 16. Thus, it is to be understood that the invention is not limited to the embodiments disclosed which are illustratively offerd and that modifications may be made without departing from the invention.

What is claimed is:

1. A method of forming a unitary decorative laminate having registered color and embossing comprising:
   A. assemblying in a stack from the bottom up
      (1) backing means for said decorative laminate,
      (2) a thermosetting resin impregnated fibrous print sheet provided with a first color,
      (3) a dried opacifying coating comprising a thermosetting resin having dispersed therein finely divided pigment of a color contrasting with said first color,
      (4) a fibrous overlay sheet impregnated with a thermosetting resin, and
      (5) a sculptured pressing plate die having a surface with high areas and low areas capable of being impressed into the uppermost of said fibrous sheets, and means to prevent said sculptured pressing plate die from sticking to said overlay sheet during lamination;
   B. applying to the upper and lower surfaces of said assembly sufficient heat and pressure to cure said resins to product said unitary embossed decorative high pressure laminate by
      (1) effecting a lamination of said fibrous sheets together with each other and with said backing means,
      (2) imparting the sculptured surface of said die to the uppermost of said fibrous sheets and
      (3) effecting lateral flow of said opacifying setting resin and pigment coating from the debossed portions beneath the surface of said laminate to the embossed portions of said laminate so that said first color is visible in said debossed portions and said contrasting color of said finely divided pigment is visible in said embossed portions; and
   C. stripping said sculptured die from the resultant laminated assembly so as to provide said laminate having areas of registered color and embossing.

2. A method in accordance with claim 1, comprising, as preliminary steps,
   impregnating said print sheet with said thermosetting resin, which resin comprises a melamine resin; precuring said melamine resin impregnated print sheet to a volatile content of 3-5%, applying said coating as a liquid containing about 20-50% by weight based on the resin solution to the upper surface of said pre-cured print sheet at the rate of about 2-5 g/ft.$^2$; and drying said coating to provide a volatile content in the total of said print sheet and coating of about 4.5%.

3. A method in accordance with claim 1 for forming a high pressure decorative laminate, wherein said backing means comprise phenolic resin impregnated core sheets, wherein said print sheet comprises a melamine resin impregnated α-cellulose paper wherein said melamine resin is pre-cured to a volatile content of about 3-5%, said overlay sheet comprises melamine resin impregnated α-cellulose paper; and said thermosetting resin in said coating comprises malamine resin, said coating being applied to the upper surface of said print sheet.

4. A method in accordance with claim 3 wherein said means to prevent said sculptured pressing plate die from sticking to said overlay sheet comprises a separate release sheet.

5. A method in accordance with claim 3 wherein said pressing plate die comprises a thin, embossed, impregnated separator sheet having a non-stick facing.

6. A method in accordance with claim 3 wherein in step B said assembly is pressed at approximately 800-1600 psi at a temperature on the order of 230°-310° F.

* * * * *